(No Model.)
F. H. MASON.
BICYCLE TIRE.
No. 475,785. Patented May 31, 1892.
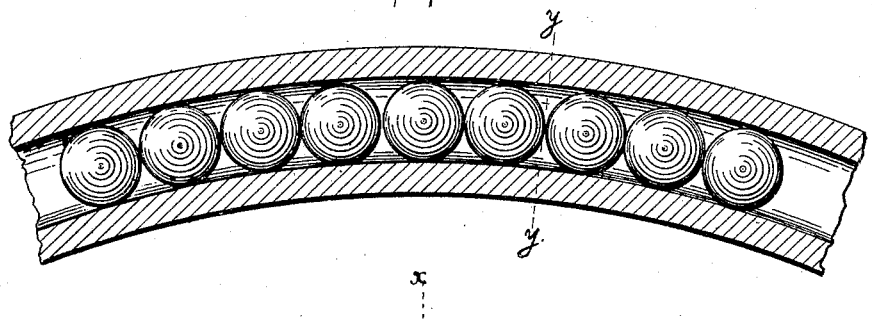
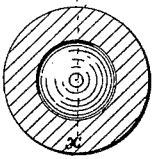
Witnesses.
Bell S. Lowrie
C. E. Humphrey
Inventor
Frank H. Mason,
by C. R. Humphrey,
Attorney.

UNITED STATES PATENT OFFICE.

FRANK H. MASON, OF AKRON, OHIO.

BICYCLE-TIRE.

SPECIFICATION forming part of Letters Patent No. 475,785, dated May 31, 1892.

Application filed November 28, 1890. Serial No. 372,965. (No model.)

*To all whom it may concern:*

Be it known that I, FRANK H. MASON, a citizen of the United States, residing at Akron, in the county of Summit and State of Ohio, have invented a certain new and useful Improvement in Bicycle-Tires, of which the following is a specification.

My invention has relation to improvements in that class of elastic tires for bicycles and other vehicles known as "cushion" tires. This class of tires has ordinarily consisted of a continuous rubber tube arranged to be placed upon the periphery of the wheel and then expanded by compressed air forced into its interior by means of a hand-pump or compressible bulb detachable when not in use.

The objections to the tire thus constructed are, first, that it requires frequent renewals of the internal air-pressure to keep the tire firm, and, second, that a slight puncture, as from a sharp stone or other substance, affords an escape for the compressed air and permits the tire to collapse.

The objects of my invention are to overcome the aforesaid objections and to provide a tire which shall embody all the desirable features of the aforesaid hollow tire and avoid the objections thereto.

My invention consists in the novel construction and combination of parts hereinafter claimed, reference being had to the accompanying drawings, forming a part of this specification.

In the accompanying drawings, Figure 1 is a section of my improved tire at the line *x x* of Fig. 2; Fig. 2, a section at the line *y y* of Fig. 1; Fig. 3, a section of a ball having a thick shell; Fig. 4, a section of a ball having a thin shell.

My invention consists, essentially, in an endless closed rubber tube more or less filled with hollow elastic balls of the same diameter as the internal diameter of the tube. I prefer to first vulcanize these balls and then insert them in the tube during the process of manufacture; but the tube may be first vulcanized and the balls inserted through an opening which is afterward closed and cemented.

The objects attained by placing the balls in the tire are, first, the additional elasticity and rigidity imparted to the tube by the insertion of hermetically-sealed elastic balls therein, and, second, should any sharp substance cause a puncture of the tube the efficiency of the tire is not thereby destroyed, and, finally, if several of the balls as well as the tube be punctured the tire would not be rendered useless, as each ball is an independent cushion entirely separate from the others, and it would require a puncture of them all to completely ruin it.

When a greater degree of firmness is desired, I increase the thickness of the shell of the balls, as shown in Fig. 3; but if the tire is intended for children, ladies, or light-weight persons I decrease the thickness of said shells, as shown in Fig. 4.

It is my practice in constructing the tire to make them somewhat less in length than the periphery of the wheel, so that they require to be stretched to put them in place. This aids the cement in retaining them in place and materially contributes to their elasticity and efficiency.

In case the tire is to be used where there is great danger of puncture I insert during the process of manufacture in the shell of the tube a layer of canvas or duck.

What I claim is—

A tire for bicycles, consisting of an endless closed rubber tube filled with hollow rubber balls of the same diameter as the inside diameter of the tube, substantially as shown and described.

In testimony that I claim the above I hereunto set my hand.

FRANK H. MASON.

In presence of—
C. E. HUMPHREY,
C. P. HUMPHREY.